United States Patent Office 2,763,328
Patented Sept. 18, 1956

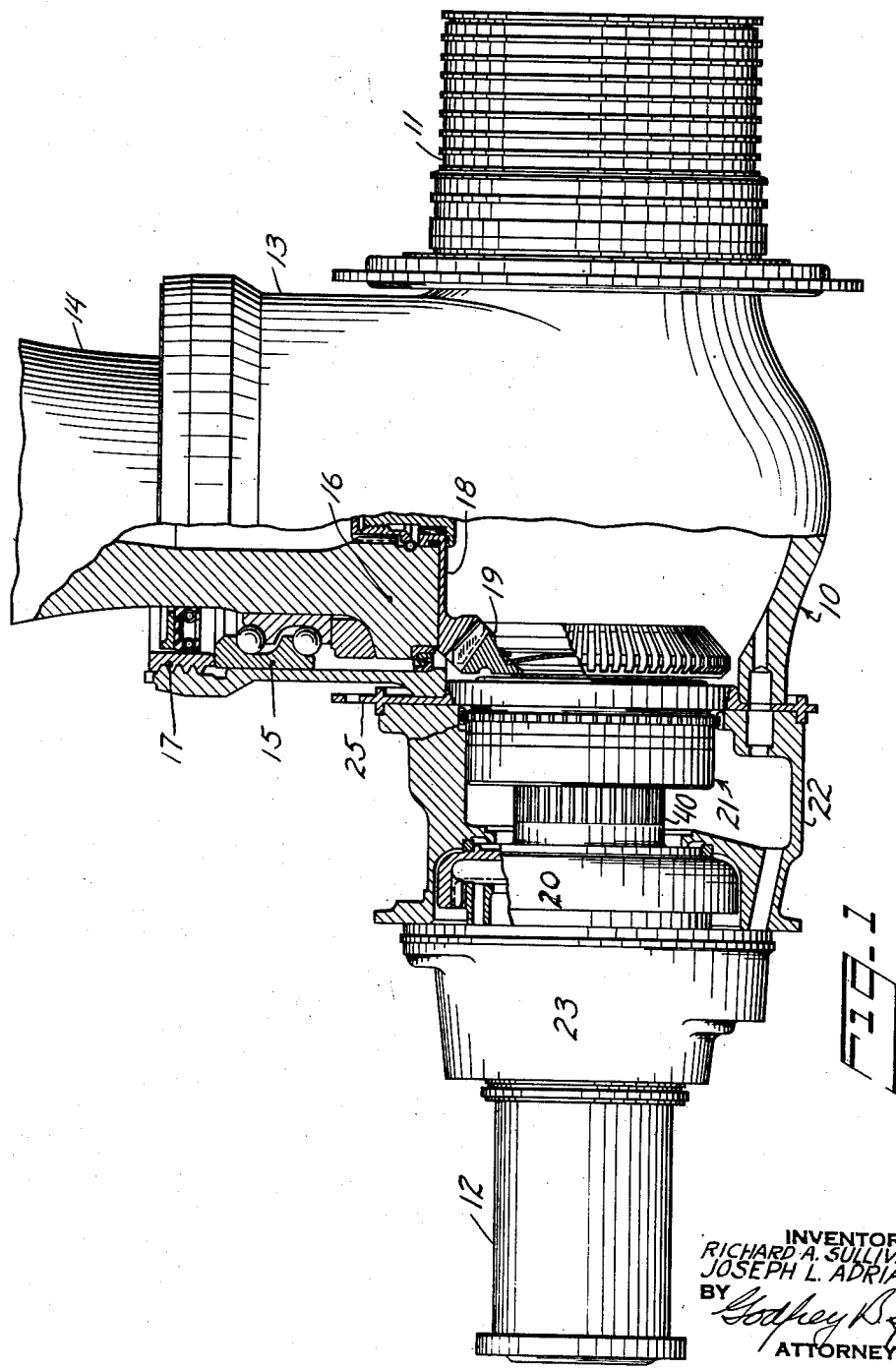

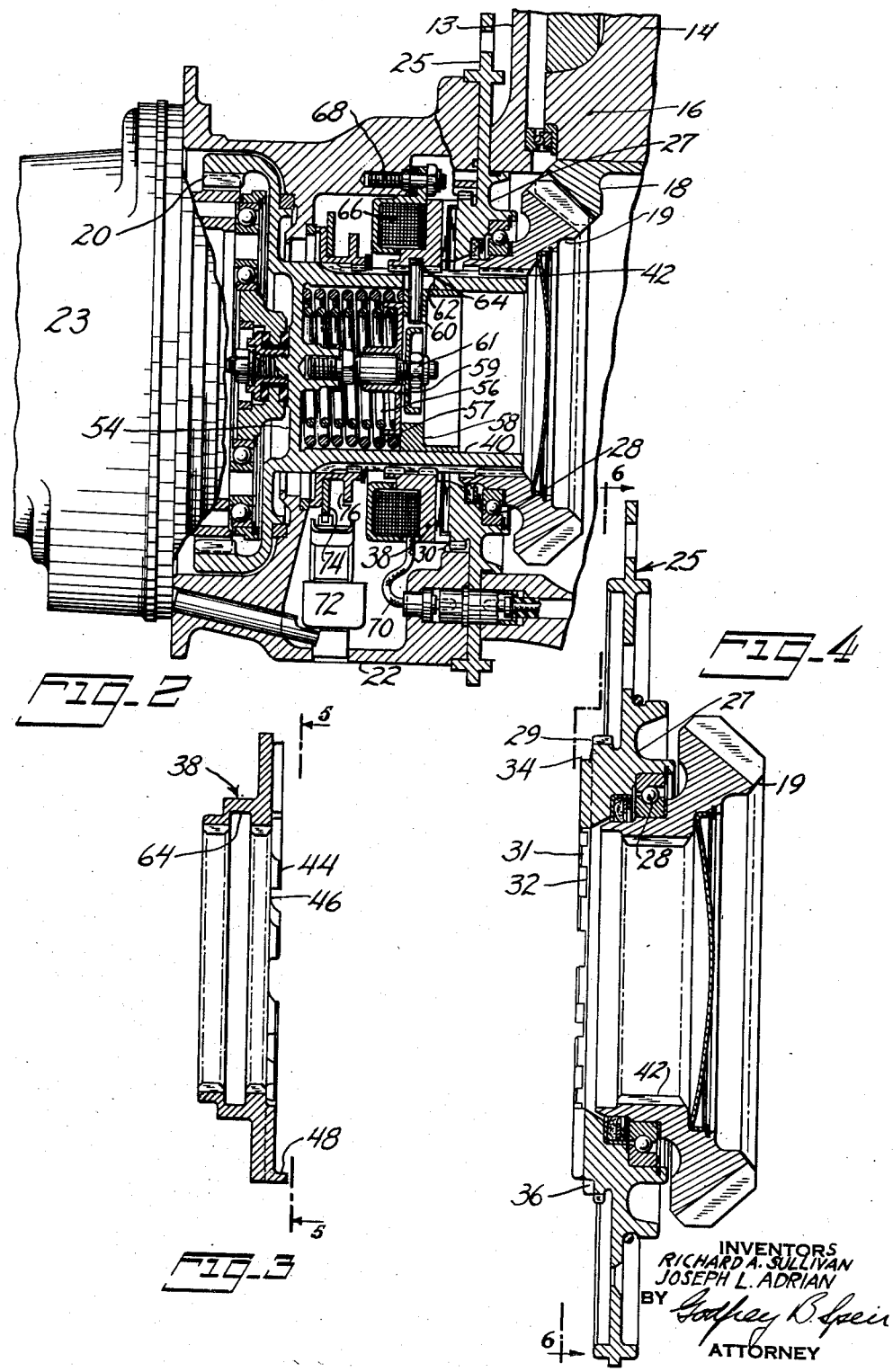

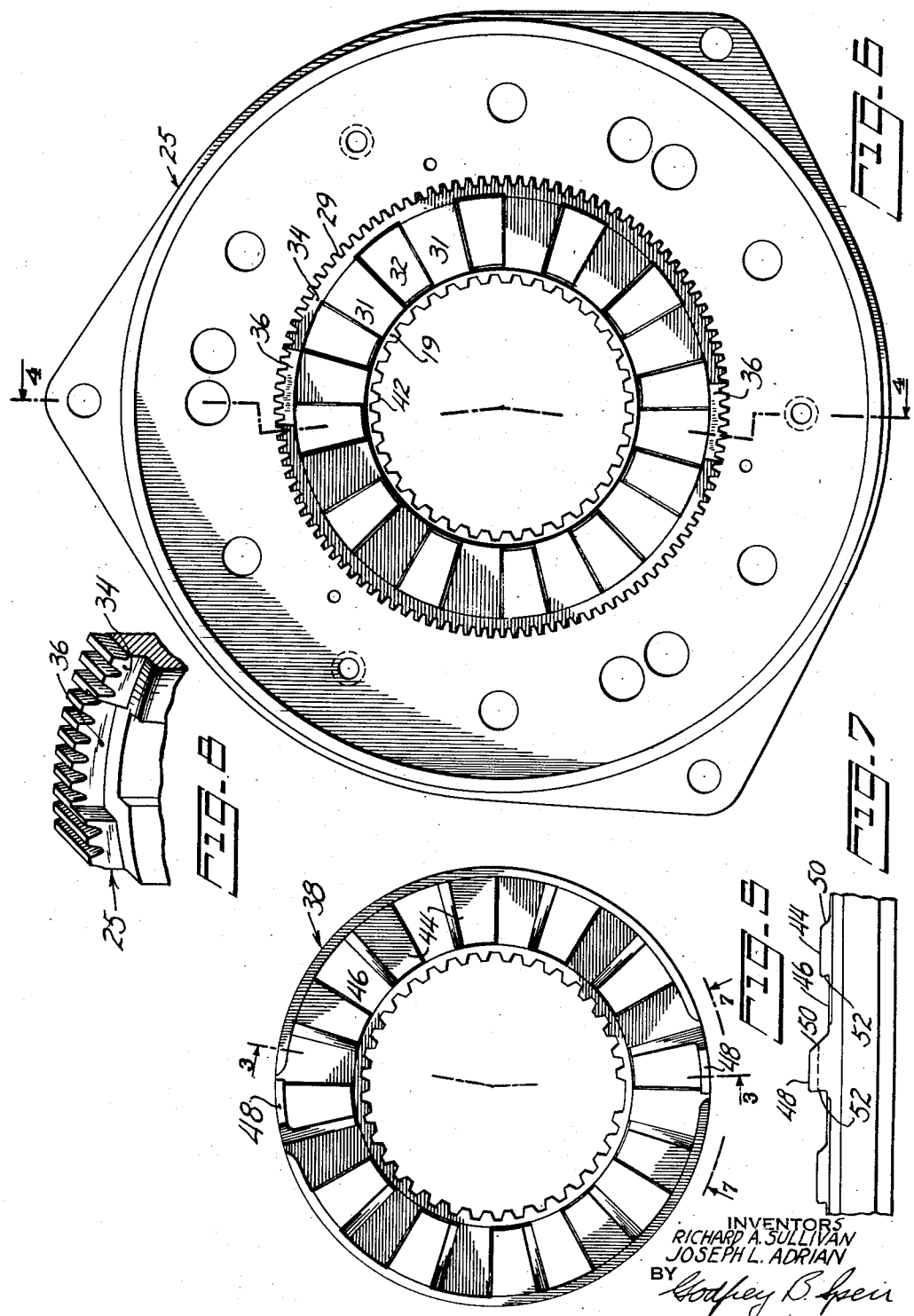

2,763,328

AERONAUTICAL PROPELLER LOW PITCH LIMIT STOP

Richard A. Sullivan, Clifton, and Joseph L. Adrian, River Edge, N. J., assignors to Curtiss-Wright Corporation, a corporation of Delaware Application March 15, 1954, Serial No. 416,064

6 Claims. (Cl. 170—160.3)

This invention relates to variable pitch aeronautical propellers of the type wherein the propeller blades are adjustable during propeller operation over a wide range of blade angles including a normal positive pitch range and a negative pitch range. In particular, the invention provides a positive low pitch limit stop to prevent inadvertent propeller pitch reversal. The invention further includes means to render the positive low pitch limit stop inactive at times when reverse pitch angles of the propeller are deliberately required.

There have been instances in the past when propeller pitch reversal has occurred when it is not desired, due possibly to failure of some part of the control mechanism. Such inadvertent propeller reversal can produce effects on the flight of the aircraft which are difficult to manage and accordingly, means to prevent such reversal of propeller blade pitch affords a highly desirable improvement.

It is an object of the present invention to provide a positive low pitch limit stop for propellers which is always available for engagement during normal conditions of propeller operation, to prevent the reduction of propeller pitch below a positive predeterminate blade pitch angle. This engagement of the low pitch stop will occur at such times as pitch changing signals to the propeller, whether purposeful or inadvertent, would tend to reduce the propeller pitch below the predeterminate minimum. A further object of the invention is to provide means, selectively operable, to prevent engagement of the low pitch limit stop when deliberate operation in a reverse pitch range of propeller blade pitch is deliberately desired. A further object of the invention is to render the low pitch limit stop and its disengaging means reversible, and to so organize the apparatus that it is fail-safe whereby to assure operation of the mechanism in its intended manner. A further object of the invention is to provide low pitch limit stop mechanism which is rendered inactive only when reverse pitch operation of the propeller is deliberately preselected and to reactivate the low pitch limit stop mechanism in the reverse pitch range, whereby upon return from reverse, the low pitch limit stop is again made available for preventing inadvertent propeller pitch reversal.

The particular low pitch limit stop mechanism of the invention is adapted for use with propellers wherein there is a rotary member, selectively operable, to change the pitch of the propeller blades. The low pitch limit stop mechanism includes a solid coupling which permits propeller blade pitch change above a pre-established minimum pitch angle, but which positively engages when the propeller blades reach a low positive pitch, to prevent blade pitch reduction below a pre-established blade angle. Means are provided, controlled by the propeller control system, to prevent engagement of the low pitch limit stop coupling only when the control system is deliberately operated to move the propeller blades to a negative or reverse blade angle.

The specific apparatus of the invention, used for illustrating the principles of the invention, are shown in the attached drawings in which similar reference characters indicate similar parts, and in which:

Fig. 1 is a longitudinal view of a propeller, partly broken away and partly in section, to show the locale for the invention;

Fig. 2 is an enlarged longitudinal section through a portion of the propeller showing the specific provisions of the invention;

Fig. 3 is a section on the line 3—3 of Fig. 5 and represents a part of the mechanism of Fig. 2;

Fig. 4 is a section on the line 4—4 of Fig. 6 and represents a part of the mechanism of Fig. 2;

Fig. 5 is an elevation on the line 5—5 of Fig. 3;

Fig. 6 is an elevation on the line 6—6 of Fig. 4;

Fig. 7 is an enlarged fragmentary view on the line 7—7 of Fig. 5; and

Fig. 8 is an enlarged fragmentary perspective view of a portion of Fig. 6.

Referring first to Figs. 1 and 2, we show a propeller hub 10 adapted to be secured in a manner well known in the art to the driving shaft of a power plant or reduction gear. The hub carries an assembly of slip rings 11 which are connected internally of the propeller to various components thereof, including a reversible electric motor 12 mounted coaxial with the hub at its outboard end. These slip rings are adapted to be engaged by brushes, not shown, forming part of a non-rotating assembly secured to the power plant or reduction gear. The hub includes one or more blade sockets 13 in which are mounted propeller blades 14 through bearing retention arrangements 15. The inner butt end of the blade 14 is flanged as at 16 to provide an abutment for the bearing assembly 15, and the bearing assembly is held in the socket 13 by appropriate means such as a retaining nut 17. The inner end of the blade 16 is provided with a bevel gear or bevel gear segment 18 engaged by a power gear 19 which is driven rotationally in either direction by selective operation of the electric motor 12. A speed reducer 20 is interposed in the drive from the motor 12 to the gear 19 to reduce the speed of the high speed motor 12 and to provide high torque to the gear 19. Between the speed reducer 20 and the gear 19, a low pitch limit stop assembly 21 is inserted, the details of which are shown in other figures.

The low pitch limit stop assembly 21 is contained within a housing 22 which also serves as a spacer between the propeller hub 10 and a housing 23 for the reduction gear 20.

Referring now to Fig. 2 and the other figures of the drawings, a coupling plate 25 is disposed between the hub 10 and the housing 22. This coupling plate, shown also in Figs. 4 and 6, includes an outer annulus and inner boss 27, the latter carrying a bearing 28 for supporting the power gear 19. The boss 27 includes external splines 29 engaging internal splines 30 formed in the housing 22 to constrain the hub 10, the member 25 and the housing 22 against relative rotation. The outboard face of the boss 27 is formed as an element of a multiple dog clutch, including raised dogs 31 alternating with depressions 32. As shown, there are 12 dogs and 12 intermediate depressions. The outer rim, surrounding the dog teeth 31 and the depressions 32 is formed as a blocking ring 34 having two opposed slots 36 therein.

Within the housing 22 is a coupling member 38 slidably splined for axial movement on a hollow shaft 40 which is the transmission member from the reduction gear 20 to the power gear 19, the power gear being splined on the hollow shaft 40 as at 42. The coupling member 38, through its splined connection to the shaft 40 is axially movable along the shaft but is constrained for rotation therewith. The inboard face of the coupling member 38 as shown in Figs. 3 and 5 is provided with a plurality of clutch dogs 44, the number of dogs being the same as the number of depressions 32 in the member 25. The dogs 44 are separated by depressions 46. When the coupling is engaged, the dogs 44 of the member 38 engage within the depressions 32 of the member 25 and correspondingly, the dogs 31 of the member 25 engage in the depressions 46 of the member 38, thereby providing a rotational lock of very high torque capacity to prevent rotation of the hollow shaft 40 in a pitch decreasing direction and thereby to prevent reduction in the blade angle of the propeller blades 14 below a desired minimum positive pitch angle.

Since the twelve dogs in the coupling members 25 and 38 would allow engagement of the coupling members at intervals of 30° during rotation of the shaft 40, the clutch members are prevented from engagement in all relative rotational positions of the coupling members except one, which one blade angle position is selected as the minimum positive blade pitch angle tolerable for the system under normal operating conditions. This blade pitch angle would normally be about 16°, but may deviate from this specific angle from about 10° to 25° according to the desired characteristics of the propeller system. To inhibit coupling of the members 25 and 38 except at the desired low pitch blade angle, the member 38 is provided with a pair of opposed teeth 48, higher than the dogs 44 as shown in Fig. 7. The faces of the teeth 48 normally bear on the blocking ring 34 of the member 25. But when the member 38 is rotated so that the teeth 48 lie opposite the slots 36 in the member 25, the coupling member 38 may move in an inboard direction to permit engagement of the dogs of the members 25 and 38 to prevent further rotation of the members. The angular extent of the teeth 48 is somewhat less than the angular extent of the slots 36 so that the engagement of the teeth 48 with the slots 36 may be made easily, first to allow bearing of the dogs 44 on the member 38 with the faces of the dogs 31 on the member 25. Then, upon continued rotation of the member 38 relative to the member 25, coupling engagement is assured. The dogs 44 and the teeth 48 on the member 38 are chamfered on one side as at 50 so that disengagement of the coupling members is automatic when the hollow shaft 40 is rotated in a pitch increasing direction. The opposite faces of the dogs 44 and teeth 48, as at 52, are squared off or undercut to provide a positive locking engagement of the couplings when they move axially toward one another and are rotated into contact.

Within the hollow shaft 40 as shown in Fig. 2, there is a bulkhead 54, forming an abutment for the ends of one or more compressed springs 56 and 57. The opposite end of the spring 57 engages a slidable bulkhead 58 within the shaft 40. The slidable bulkhead 58 carries one or more pins 60 extending through elongated slots 62 in the hollow shaft 40, the outer ends of the pins engaging an annular groove 64 in the member 38. By this arrangement, the bulkhead 58 is constrained to move axially with the member 38, and thereby, the spring 57 continually urges the member 38 in an inboard direction toward coupling engagement. The spring 57 provides the force necessary to engage the couplings 38 and 25 when the blocking ring 34 allows coupling engagement. Spring 56 at its inboard end engages a washer 59 bearing at times on the bulkhead 58 to augment the force tending to move the coupling plate 38 in an inboard direction, and ordinarily forcing the teeth 48 into non-chattering engagement with the blocking ring 34. Inboard expansion of spring 56 is limited by engagement of washer 59 with a stud 61, leaving spring 57 to accomplish final coupling engagement.

By the structure described, it is apparent that the blades of the propeller are normally prevented from going to a pitch angle below the pre-established low positive pitch limit. Means are provided to prevent coupling engagement under certain conditions, as when it is desired deliberately to move the propeller blades to a reverse pitch blade angle. To this end, a solenoid 66 is secured as at 68 within the housing 22, this solenoid being energizable to hold the coupling member 38 in an inboard direction to prevent engagement thereof with the member 26 and holding the springs 56 and 57 compressed. The casing for the solenoid 66, and also the member 38, are preferably made from magnetic material such as steel so that the solenoid 66, when energized, will hold the member 38 in its outboard position or move it to the outboard position if the coupling 25, 38 is engaged. Connections to the solenoid 66 are made through conductors 70 to one or more of the slip rings 11 which are coordinated with the propeller control system so that the solenoid is energized only when reverse pitch propeller operation has been initiated by the control system. Such initiation concurrently energizes the solenoid 66 and energizes the motor 12 for pitch decrease. The pitch decreasing movement of the shaft 40 then may proceed without interruption until the pitch angle of the blade 14 reaches the negative pitch limit or, reaches a negative pitch region which may be otherwise controlled for governing in a manner known in the art. Various pitch limits are established in the system, insofar as operation of the electric motor 12 is concerned by limit switches such as 72 (Fig. 2). Suitable electrical connections are made to limit switches such as 72 and to other electrical components of the system within the hub 10 and its associated parts. One of the limit switches 72 is for normal low positive pitch, and is set to break at a blade pitch angle about 4° greater than the low positive pitch angle for which the coupling 25, 38 is set. Thereby the coupling does not engage during normal propeller operation, but is available to limit low positive pitch if the limit switch or other part of the system should malfunction or fail.

By connecting the solenoid 66 only in that part of the control system wherein reverse pitch propeller operation may be selected, the system becomes fail-safe since, under normal conditions, there is nothing to hold the members 25 and 38 from coupling engagement except the engagement of the teeth 48 on the member 38 with the blocking ring 34 on the member 25. Whenever, within energization of the solenoid 66, the blade pitch angle approaches the low positive pitch limit, the teeth 48 may drop into the slots 36, the coupling members engage, and a positive, rugged, mechanical lock is brought into operation to prevent further decrease of propeller blade pitch.

The pitch limit switches like 72 are secured within the housing 22 and are actuated by cams 74 secured to a sleeve 76 splined on the shaft 40. The cams 74 may be adjusted when being secured to the sleeve 76 to pre-establish a desired variety of blade pitch limits. The switches 72 are connected in the motor circuit and to the slip rings 11 generally in the fashion shown in Patent No. 2,634,815 issued April 14, 1953.

The detailed structure above described and shown in the drawings constitutes a preferred arrangement for a positive low pitch stop and may be incorporated in certain standard types of propellers with a minimum of modification thereof. The principles of the invention, however, in providing a positive mechanical low pitch limit stop may also be adapted to various propeller designs, through skillful modification of the specific teachings of the invention. Any such skillful modifications are intended to come within the scope of the invention.

Though one embodiment of the invention is shown, it is to be understood that the invetnion may be applied in various forms and in various environments. Changes may be made in the arrangements shown without departing from the spirit of the invention. Reference should be had

What is claimed is:

1. In variable pitch propeller having blades movable in pitch between a positive blade angle range and a negative blade angle range, a mechanical low positive pitch stop active under all normal operating conditions to engage and prevent propeller blade pitch reversal, a control means for selectively reversing propeller blade pitch, means operated by said control means to hold said low positive pitch stop out of action, a control means operable to change propeller blade pitch in the normal positive range, low positive pitch limiting means cooperating to disconnect said latter control means at a blade pitch angle between 2° and 6° greater than the pitch angle established by action of said mechanical low positive pitch stop, and means operated by said first control means to inactivate said low positive pitch limiting means.

2. In a variable pitch propeller comprising a hub, a power unit coaxial therewith, a power gear in the hub, a shaft coupling said gear to said unit, and blades in said hub having gears meshed with said power gear, a multiple dog clutch element secured to said hub, a movable multiple dog clutch element rotatable with and slidable along said shaft, said clutch elements normally being engageable at a plurality of blade angles, elastic means acting on said movable element and urging it into clutching engagement with said hub-secured element, means to inhibit clutch element engagement except at blade pitch angles between substantially 10° and 25°, and selectively operable means to hold said clutch elements out of engagement.

3. In a variable pitch propeller comprising a hub, a power unit coaxial therewith, a power gear in the hub, a shaft coupling said gear to said unit, and blades in said hub having gears meshed with said power gear, a dog clutch element secured to said hub, a movable dog clutch element rotatable with and slidable along said shaft, elastic means acting on said movable element and urging it into clutching engagement with said hub-secured element, said clutch elements comprising a plurality of 6 or more dogs, a blocking ring on one of said elements having a slot therein, and a tooth on the other element, normally bearing on said blocking ring and holding said dogs from engagement, and engageable at times within said slot to enable engagement of said clutch dogs, said blocking ring slot and tooth being so related as to interengage at a blade angle between 10° and 25°.

4. In a variable pitch propeller comprising a hub, a power unit coaxial therewith, a power gear in the hub, a shaft coupling said gear to said unit, and blades in said hub having gears meshed with said power gear, a dog clutch element secured to said hub, a movable dog clutch element rotatable with and slidable along said shaft, elastic means acting on said movable element and urging it into clutching elements comprising a plurality of 6 or more dogs, a blocking ring on one of said elements having a slot therein, and a tooth on the other element, normally bearing on said blocking ring and holding said dogs from engagement, and engageable at times within said slot to enable engagement of said clutch dogs, said blocking ring slot and tooth being so related as to interengage at a blade angle between 10° and 25°, and means selectively operable to hold said elements from engagement to allow pitch change to blade angles in the negative pitch range.

5. In a variable pitch propeller including blades movable between a positive pitch range and a negative pitch range, a control system for adjusting blade pitch in the positive range, a limit switch in the propeller actuated by blade pitch change in a decreasing direction to disconnect said control system at a small positive blade pitch angle to terminate further pitch change, and a mechanical positive low pitch limit stop to limit blade pitch to a finite positive pitch angle substantially two to six degrees less than the pitch angle at which said limit switch operates.

6. In a variable pitch propeller including blades movable between a positive pitch range and a negative pitch range, a control system for adjusting blade pitch in the positive range, a limit switch in the propeller actuated by blade pitch change in a decreasing direction to disconnect said control system at a small positive blade pitch angle to terminate further pitch change, and a mechanical positive low pitch limit stop to limit blade pitch to a finite positive pitch angle substantially two to six degrees less than the pitch angle at which said limit switch operates, and selectively operable means to neutralize concurrently the action of said limit switch and of said mechanical stop.

References Cited in the file of this patent

UNITED STATES PATENTS

| | | |
|---|---|---|
| 2,477,868 | Forman | Aug. 2, 1949 |
| 2,487,239 | Hardy | Nov. 8, 1949 |
| 2,542,463 | Beard | Feb. 20, 1951 |
| 2,592,124 | Diefenderfer | Apr. 8, 1952 |
| 2,600,017 | Morris et al. | June 10, 1952 |
| 2,609,057 | Crowhurst | Sept. 2, 1952 |
| 2,634,815 | Frank | Apr. 14, 1953 |